United States Patent [19]

Auer et al.

[11] Patent Number: 6,165,635
[45] Date of Patent: Dec. 26, 2000

[54] PT/RH/FE ALLOY CATALYST FOR FUEL CELLS AND A PROCESS FOR PRODUCING THE SAME

[75] Inventors: Emmanuel Auer, Frankfurt; Gerhard Heinz, Hasselroth; Thomas Lehmann, Langenselbold; Robert Schwarz; Karl-Anton Starz, both of Rodenbach, all of Germany

[73] Assignee: Degussa-Hüls Aktiengesellschaft, Frankfurt, Germany

[21] Appl. No.: 09/418,556

[22] Filed: Oct. 14, 1999

[30] Foreign Application Priority Data

Oct. 17, 1998 [DE] Germany .......................... 198 48 032

[51] Int. Cl.$^7$ ...................................................... H01M 4/86
[52] U.S. Cl. ................ 429/40; 429/44; 502/326
[58] Field of Search ......................... 429/40, 44; 502/326

[56] References Cited

U.S. PATENT DOCUMENTS

| | | | |
|---|---|---|---|
| 4,447,506 | 5/1984 | Luczak | 429/44 |
| 4,677,092 | 6/1987 | Luczak | 502/185 |
| 5,013,618 | 5/1991 | Luczak | 429/44 |
| 5,068,161 | 11/1991 | Keck | 429/44 |
| 5,068,214 | 11/1991 | Cordier et al. | 502/185 |
| 5,489,563 | 2/1996 | Brand et al. | 429/44 |
| 5,702,836 | 12/1997 | Ma et al. | 502/326 |
| 5,876,867 | 3/1999 | Itoh et al. | 429/40 |
| 6,007,934 | 12/1999 | Auer et al. | 429/40 |
| 6,066,410 | 5/2000 | Auer et al. | 429/40 |

FOREIGN PATENT DOCUMENTS

| | | |
|---|---|---|
| 0665985 | 8/1995 | European Pat. Off. . |
| 0827225 | 3/1998 | European Pat. Off. . |
| 3623686 | 7/1987 | Germany . |
| 69002487 | 9/1990 | Germany . |
| 69307534 | 5/1994 | Germany . |
| 19517598 | 1/1997 | Germany . |
| 1003499 | 9/1965 | United Kingdom . |

*Primary Examiner*—Bruce F. Bell
*Attorney, Agent, or Firm*—Smith, Gambrell & Russell, LLP; Beveridge, DeGrandi, Welcher & Young

[57] ABSTRACT

A platinum alloy catalyst on an electrically conductive carbon support which contains an alloy of 40 to 60 atom-% of platinum, 10 to 20 atom-% of rhodium and 20 to 50 atom-% of iron in the form of finely divided alloy particles. The catalyst is characterised in that the average particle size of the alloy particles is less than 10 nm.

9 Claims, No Drawings

PT/RH/FE ALLOY CATALYST FOR FUEL CELLS AND A PROCESS FOR PRODUCING THE SAME

INTRODUCTION AND BACKGROUND

The present invention relates to a platinum alloy catalyst comprising a ternary platinum/rhodium/iron alloy on an electrically conductive carbon support. The ternary alloy is present in the form of finely divided alloy particles on the support material.

Platinum and in particular alloyed platinum catalysts on electrically conductive carbon supports are used as electro-catalysts for anodes and/or cathodes in fuel cells, preferably in phosphoric acid fuel cells (phosphoric acid fuel cell, PAFC) and polymer-electrolyte membrane cells (polymer electrolyte membrane fuel cell, PEMFC). Oxygen or air are used as the oxidizing agent on the cathode side. Hydrogen, hydrocarbons such as, for example, methane, higher alkanes or oxygen-containing hydrocarbons such as, for example, alcohols, or their reformates are used as fuels on the anode side. The conventional platinum loading is in the range 5 to 80, preferably in the range 10 to 50 wt. %, with respect to the total weight of catalyst. Carbon black, graphitized carbon black, graphite, carbides and their physical mixtures are used as electrically conductive carbon supports depending on the electrode face.

It is known that the electrical power produced by a phosphoric acid fuel cell depends substantially on the activity of the cathode catalyst. Therefore cathode catalysts are required which have a high current density for a given voltage and a low voltage drop during the lifetime of the catalyst. This leads to lower costs per unit of current produced.

A number of different platinum alloy catalysts have proven to be suitable catalyst systems with good power data, these mainly containing cobalt and chromium as other constituents.

Various processes for preparing these types of alloy catalysts are described in the patent literature. The individual processes differ substantially by the precursors used for the alloy components and by the type and manner of deposition of the alloy components on the conductive carbon support. The type and manner of deposition is a critical factor since the degree of dispersion of the subsequent alloy particles on the support, and thus the catalytically active metal surface area available for the electrochemical process, is largely determined by this process step.

After deposition on the support the alloy components may be reduced in a wet chemical process or in a gas phase reduction process.

All known processes complete preparation of the catalyst with a thermal treatment between 800 and 1000° C. in an inert or reducing atmosphere. Reduction of the alloy components is completed during this thermal treatment.

The alloy catalysts, in comparison to pure platinum, are characterized in particular by improved ageing stability under the strongly corrosive conditions which exist during operation of a phosphoric acid fuel cell (operating temperature 170° C. to 220° C., 100% strength phosphoric acid as the electrolyte).

EP 0 665 985 B1 discloses the production of a ternary Pt/Rh/Fe catalyst which is intended to be characterised by an improved long-term stability as compared with the Pt/Co/Cr catalyst disclosed in U.S. Pat. No. 4,447,506 and in U.S. Pat. No. 4,677,092. EP 0 665 985 B1 is relied on and incorporated herein by references.

The Pt/Rh/Fe catalyst is produced in a multistage process, wherein in a first stage a supported, bimetallic platinum/rhodium catalyst is first prepared on a graphitized carbon black and this is impregnated with iron in a further step. An ordered Pt/Rh/Fe alloy catalyst with a cubic face-centred crystal structure is obtained by calcining the catalyst at temperatures between 800 and 1000° C. and post-annealing at about 600° C.

The process described for preparing the platinum alloy catalyst has a number of disadvantages.

Deposition of the alloy components on the support in EP 665 985 B1 is performed in several stages. This process is time-consuming and also sometimes requires a large reaction volume. The catalyst has a relatively high chlorine content in the individual manufacturing stages and this can have a negative effect on the activity, and in particular on the long-term stability, of the final catalyst. Therefore the chlorine is removed in subsequent washing processes which are sometimes associated with subsequent hydrolysis steps. There is no data given with respect to the diameters of alloy particles which can be produced.

To produce a ternary Pt/Co/Cr catalyst, U.S. Pat. No. 4,447,506 starts from a commercial platinum catalyst on graphitized carbon black, onto which cobalt and chromium are deposited by sequential impregnation. For this purpose, the platinum catalyst is dispersed in water with the aid of ultrasound for a period of 15 minutes. The pH of the suspension is adjusted to 8 with dilute ammonia solution. Then an ammonium chromate solution is added to the suspension and the pH is adjusted to 5.5 by adding dilute hydrochloric acid in order to deposit the chromium onto the platinum. After deposition of the chromium on to the platinum, a solution of cobalt nitrate is added to the suspension. The suspension is stirred thoroughly during addition of the solutions. After filtering off and drying the catalyst, it is calcined at 900° C. for a period of 1 hour under a stream of nitrogen. Catalysts which have been prepared using this process have a non-ordered crystal structure.

According to U.S. Pat. No. 4,677,092 an ordered ternary alloy catalyst is obtained if, in addition to the process steps in accordance with U.S. Pat. No. 4,447,506, the platinum catalyst or the platinum alloy catalyst is cooled in an inert atmosphere, after calcination, at a rate which enables the production of an ordered crystal structure.

U.S. Pat. No. 5,013,618 describes the preparation of a ternary catalyst which contains a third metal in addition to platinum and iridium. To prepare this, carbon black, as a support material, is suspended in water with the addition of sodium bicarbonate. The suspension is boiled for 30 minutes with continuous stirring. Then a separately prepared solution of iridium chloride and hexachloroplatinic acid is added dropwise to the suspension. The resulting suspension is boiled for a further 15 minutes before formaldehyde is added to the suspension to reduce and precipitate platinum and iridium. After filtration the catalyst is washed with a solution of ammonium bicarbonate and dried at about 90° C. The binary catalyst obtained in this way is then suspended in aqueous solution again and a water-soluble compound of the desired third metal is added thereto. The pH of the solution is adjusted to 5.5 with ammonia. The solution is evaporated to dryness and the solids remaining are calcined for 1 hour under nitrogen at 930° C. in order to convert the deposited metals into the desired alloy. Then the temperature is lowered to 600° C. and held at this value for a further hour before the catalyst is cooled to room temperature.

GB-OS 2,242,203 and EP 0450849 A2 describe the sequential preparation of platinum alloy catalysts in a one pot process. In the context of this invention, a one pot process is understood to be a procedure in which all intermediate stages of the catalyst are kept in liquid phase without any separation, drying or an optional calcining step during preparation. The process starts from hexachloroplatinic acid which is added to a basic suspension of a conductive carbon support. Sodium carbonate is used to make the support suspension basic and this also acts as a buffer to stabilize the pH of the solution. The alloy components cobalt and chromium are added to the suspension of non-reduced Pt/C catalyst as chlorides or nitrates. Alloy-formation is completed conventionally by thermal treatment under an inert gas atmosphere. A wet chemical reduction with hydrazine, formaldehyde or formic acid may be performed first or a gas phase reduction with hydrogen is an option.

DE 44 26 973 C1 describes another process for preparing a Pt/Co/Cr catalyst. The process involves making up an aqueous suspension of the carbon support, mixing this suspension with an aqueous solution of precursors of the alloy components, precipitating the alloy components in the form of their hydroxides by adding a base, reducing with a reducing agent, washing and drying the catalyst precursor obtained in this way and calcining at temperatures above 800° C. to form the alloy. The essential point of the process is that the alloy components are nitrates which are all precipitated onto the carbon support simultaneously. The suspension of carbon support is heated to 80 to 90° C. before adding the alloy components and is held at a constant temperature between 70 and 80° C. after adding the alloy components. To complete reaction and also to deposit the alloy components, the pH of the suspension is raised to 8 to 9 by adding sodium hydroxide solution as a base. The use of alloy components in the form of nitrates is an essential factor in this process, in particular the use of platinum (IV) nitrate instead of the otherwise conventional hexachloroplatinic acid. Platinum(Iv) nitrate is characterized, in comparison to hexachloroplatinic acid, in that it can be hydrolysed very readily. The mutual precipitation of all three alloy components onto the carbon support is enabled by this property of the platinum (IV) nitrate.

An object of the present invention is to improve Pt/Rh/Fe alloy catalysts and to make them more active and more stable than traditional catalysts.

A further object of the present invention is to enable preparing this catalyst in a short time and therefore reduce production costs as compared with known processes.

SUMMARY OF THE INVENTION

The above and other objects can be achieved by a platinum alloy catalyst on an electrically conductive carbon support which contains an alloy of 40 to 60 atom-% of platinum, 10 to 20 atom-% of rhodium and 20 to 50 atom-% of iron in the form of finely divided alloy particles. The catalyst is characterized in that the average particle size of the alloy particles is less than 10 nm. Thus, the catalyst of the invention is characterized by smaller alloy crystallites, that is by a higher dispersion of active components.

The platinum is preferably present in an amount of 5 to 50, in particular 10 to 20 wt.-%, with respect to the total weight of catalyst.

The catalyst according to the invention is obtained in a one pot process by simultaneous or sequential precipitation of the corresponding hydroxides from the chloride salts of platinum and rhodium and of iron nitrate onto the carbon support suspended in water. Following the precipitation procedure is a wet chemical reduction, intensive washing, drying under vacuum and finally calcination at temperatures of more than 700° C.

Precipitation is performed using a strong base such as for example sodium hydroxide solution. It was shown that virtually quantitative hydrolysis of the chlorine compounds used was achieved by the use of a strong base and that additional purification steps to remove chlorine, as described in EP 0 665 985 B1, are not necessary.

Graphite, conductive, in particular graphitized, carbon black and/or physical mixtures of these are suitable as supports for the alloy catalyst. The specific surface area (BET) of the support should be in the range 50 $m^2/g$ to 1000 $m^2/g$. Typical support materials are Vulcan XC-72® from the Cabot Corporation, Cambridge, Massachusetts, or Shawinigan Black®, an acetylene carbon black from the Chevron company, San Francisco, California, or their graphitized variants.

Chlorides of platinum and rhodium are used as precursor compounds for preparing the alloy catalyst.

For thermal treatment, the catalyst is heated under an inert gas atmosphere, typically nitrogen, at temperatures of more than 700° C., preferably 900° C., and cooled only after being held at a constant temperature for a certain time. The residence time should be at least 30 minutes in order to enable complete reduction of the alloy components and production of the alloy, and a period of two hours should not be exceeded since thermal treatment sinters the initially finely divided alloy particles into coarser particles with increasing time.

DETAILED DESCRIPTION OF INVENTION

The catalyst according to the invention has a very homogeneous distribution of elements. The initially unordered structure of the alloy particles can readily be converted into an ordered three dimensional structure by subsequent thermal treatment and/or calcination. For this purpose, the catalyst is first cooled to a temperature in the interval between 700 and 500° C. and then calcined for a further 0.5 bis 2 hours at this temperature. The alloy particles have typical particle diameters of 6.0 to 8.5 nm, depending on the platinum loading on the support.

The particle sizes of the Pt/Rh/Fe catalyst prepared in accordance with EP 0 665 985 B1, in contrast, are well above 10 nm. The electrochemically accessible active metal surface area is therefore smaller than in the case of catalysts according to the invention and leads to a reduced electrochemical power (cell voltage). The reasons for the coarser alloy particles in accordance with EP 0 665 985 B1 are not fully understood. It is however believed that one essential reason lies in the wash processes, which are performed several times, for reducing the chlorine content and isolating the Pt/Rh-intermediate which then has to be suspended again in order to carry out deposition of the iron.

In detail, preparation of the catalyst according to the invention takes place as follows:

Graphitized carbon black, for example Vulcan XC-72 (Vulcite®), is carefully suspended in water with the aid of an Ultra-Turax instrument. The temperature of the solution then rises and is adjusted to 80° C. by additional heating. The pH of the final suspension is typically between 7 and 9. A dilute, acid solution of hexachloroplatinic acid, rhodium chloride and iron(III) nitrate is added to this hot suspension. The loading of the support with catalytically active metals and the molar ratios of these with respect to each other is adjusted by the amount and concentration of impregnating solution.

A strong base such as, for example, sodium hydroxide solution is added slowly and the pH is raised to a value between 8 and 10 in order to hydrolyze and deposit the alloy components as hydroxides. Hydrolysis of the salt solution used is completed by heating the solution to boiling point in parallel with this process and this renders costly post-washing of the catalyst superfluous due to virtually quantitative conversion of the chloride ligands into a soluble form. The rate of addition of base to the suspension should be such that an amount of base is added over the course of 30 to 120 minutes which corresponds to about 1.5 to 2.5 times the stoichiometric amount required for complete hydrolysis of the salt solution.

Hydrolysis is followed by a wet chemical reduction of the noble metal compounds by adding a reducing agent such as hydrazine, sodium borohydride, sodium formate, sodium hydrophosphate or formaldehyde.

After filtering and washing the catalyst with water, and drying the catalyst under vacuum at 100° C. to a residual moisture content of less than 2 wt. %, the trimetallic catalyst is heated at 900° C. under an inert gas atmosphere and after a residence time of 1 hour is cooled to 600° C. over the course of 30 minutes and held for 1 hour at this temperature. The production of ordered alloy crystallites of platinum, rhodium and iron is completed by this thermal treatment. After cooling to room temperature, also under an inert gas, the catalyst is ready for use.

As an alternative to the wet chemical reduction process described above, a gas phase reduction may be applied at low temperature after filtering and drying the catalyst and before calcination.

In the following examples and comparison examples, catalysts according to the invention and comparison catalysts were each prepared in batches of 50 g and their electrochemical properties were compared. A graphitized carbon black was used as support for all the catalysts. The specific surface area was determined by nitrogen adsorption using the Brunauer, Emmett and Teller method (BET-surface area) in accordance with the instructions in DIN 66 132. In comparison examples 1 to 2, Pt/Rh/Fe comparison catalysts were prepared in accordance with the only example in Patent EP 0 665 985 B1.

In all cases the size of the alloy particle and the lattice constant for the alloy produced were determined using X-ray diffraction (XRD) of the catalysts prepared and these were compared with the data from Patent EP 0 665 985 B1.

When checking the example from EP 0 665 985 BE, it became apparent that it could not be reproduced easily using the data published in the patent. The modifications and adjustments described below had to be performed in order to obtain a useable method of preparation, but the data given in EP 0 665 985 B1 was followed as closely as possible:

According to the example a Pt/Rh/Fe catalyst with an atomic ratio of 50:15:35 which contains 10 wt. % Pt and 0.33 wt. % Rh should be prepared. The data for rhodium is of course incorrect since a catalyst with the required atomic ratio must contain 1.59 wt. % of Rh for 10 wt. % of Pt.

Further checking of the numerical data showed that preparation obviously started from anhydrous rhodium chloride $RhCl_3$. The stated 0.2265 g of $RhCl_3$ contains 0.111 g of Rh, i.e. $1.078 \cdot 10^{-3}$ moles of Rh. According to the required atomic ratio of the three metals with respect to each other, the catalyst therefore contains $3.59 \cdot 10^{-3}$ moles of Pt (0.7 g Pt) and $2.52 \cdot 10^{-3}$ moles of Fe (0.14 g Fe). These quantities are applied to 6 g of support. The weight of the total catalyst is thus 6.951 g, so that it contains 1.6 wt. % Rh, 10.1 wt. % Pt and 2.01 wt. % Fe, which agrees well with the desired percentage loading with platinum.

Although anhydrous rhodium chloride is industrially available, it is, according to Hollemann-Wiberg, Lehrbuch der Anorganischen Chemie, Walter de Guyter, Berlin, New York 1985, not soluble in water, so that when repeating the example, $RhCl_3 \cdot xH_2O$ with a noble metal content of 38% had to be used as starting material. Solid hexachloroplatinic acid was used as starting material in accordance with the example. However this is industrially available only as a hexahydrate with a noble metal content of 40%, so that appropriate adjustments to the amounts used had to be made here also.

Point A5 in the example describes the addition of the dilute platinum/rhodium solution to the support suspension. Then stirring is continued for 30 minutes at boiling point. In this section, there is no data on the pH of the suspension before the reduction with formaldehyde described under point A6 is performed. In several repetitions of the example it was now observed that the pH of the suspension after noble metal addition falls to a value between 5 and 6.5. If reduction with formaldehyde is then performed in accordance with the example, dissolution of the noble metal from the support may take place due to the formation of formate from formaldehyde because of the further lowering of the pH. For this reason, either strong preneutralization of the support with a correspondingly large amount of sodium bicarbonate or post-adjustment of the pH before the reducing step with an additional amount of sodium bicarbonate (comparison example 2) is recommended.

Under point A9 in the example, the catalyst is washed four times with an ammonium bicarbonate solution, which is not described in any more detail, in order to remove chloride. In industrial processes for the preparation of catalysts, a 10 wt. % ammonium bicarbonate solution (($NH_4$)$HCO_3$ solution) is normally used. This was also used for all the repeat versions of the example from EP 0 665 985 B1.

The comparison examples carried out in this way show in each case, independently of the platinum loading after thermal treatment at 900° C., particle sizes for the Pt/Rh/Fe alloy crystallites of much more than 10 nm.

COMPARISON EXAMPLE 1

A Pt/Rh/Fe catalyst was prepared in accordance with the example from EP 0 665 985 B1.

1. 36.36 g of Vulcite® (moisture content 1.56 wt. %) were stirred in 2400 ml deionised water for 18 hours.
2. 12.55 g sodium hydrogen carbonate were added to the suspension and it was treated with a Labsonic 1510 instrument for 15 minutes. Then the mixture was heated at boiling point for 60 minutes. The pH of the solution was about 9.
3. 10.53 g of solid hexachloroplatinic (IV)acid (40 wt. % Pt) were dissolved in 60 ml of water.
4. 1.76 g of $RhCl_3 \cdot 3H_2O$ (38 wt. % Rh) were dissolved in 9.5 ml of water and combined with the platinum solution.
5. This Pt/Rh salt solution was added dropwise to the suspension over the course of 15 minutes. The mixture was then stirred for 60 minutes at boiling point. The pH was then about 6.
6. A dilute formaldehyde solution (3.06 ml HCOH-solution, 37 wt. %, diluted with fully deionized water to a total volume of 100 ml) was added dropwise to the boiling suspension and stirring was continued for another 60 minutes.
7. The Pt/Rh precatalyst was then filtered hot.

8. After filtration, the filter cake was taken up 4 times in 2200 ml distilled water each time, 700 ml of 10 w.% (NH$_4$)HCO$_3$ solution were added and the mixture was filtered again after stirring for a further 60 minutes.
9. The product was then dried under vacuum at 82° C.

The ternary alloy catalyst was prepared from the catalyst precursor obtained in this way as follows:

10. 20.03 g of Pt/Rh catalyst (moisture content 0.19 wt.%) were again suspended in 300 ml of distilled water and the mixture was treated with a Labsonic 1510 instrument for 10 minutes.
11. 2.89 g of iron(III) nitrate nonahydrate were dissolved in 150 ml of distilled water and added to the catalyst suspension.
12. Then the suspension was adjusted to a pH of 5.5 with dilute NH3 solution.
13. The suspension was again subjected to ultrasonic treatment for 10 minutes and stirred for 10 minutes, wherein the suspension was held at a pH of 5.5 with dilute ammonia.
14. After filtration, the catalyst was dried at 80° C. for 18 hours.
15. To produce the alloy, the catalyst was calcined under nitrogen at 927OC for one hour and then again at 593° C. for one hour.

XRD analysis showed a size for the Pt/Rh/Fe alloy crystallites of 11.0 nm. The lattice constant was 0.3836 nm. The specific platinum surface area was determined with TEM (Transmission Electron Microscopy) assuming the presence of spherical hemispheres and produced a value of 27 m$^2$/g. The catalyst had the molar composition Pt$_{50}$Rh$_{15}$Fe$_{35}$ with a platinum content of 10 wt.%.

COMPARISON EXAMPLE 2

Another Pt/Rh/Fe catalyst was prepared in accordance with comparison example 1. In this case the pH was adjusted to 7.5 prior to reduction with formaldehyde (step 6) in order to minimize the risk of noble metal loss. XRD analysis produced a size for the Pt/Rh/Fe alloy crystallites of 12.5 nm. The lattice constant was 0.3842 nm. The catalyst had the molar composition Pt$_{50}$Rh$_{15}$Fe$_{35}$ with a platinum content of 10 wt. %.

In further trials, industrially available solutions of the two compounds were used instead of the solid compounds RhCl$_3$·H$_2$O and H$_2$[PtCl$_6$]·6H$_2$O. Even these trials did not lead to smaller alloy particles.

EXAMPLE 1

To prepare a catalyst according to the invention, 43.63 g of Vulcite® (moisture content 0.97 wt. %) were suspended in 1500 ml deionized water and stirred for 30 minutes with an Ultra-Turax. The pH of this solution was about 8.

20 g of a solution of hexachloroplatinic (IV) acid (25 wt. %) and 3.95 g of a solution of rhodium(III) chloride (20 wt. %) were diluted with deionized water to give a total volume of 150 ml. The noble metal solution had a pH of about 1. Then the solution was added dropwise over the course of 10 minutes to the boiling support suspension and stirring was continued for 15 minutes. The pH was raised to 9 with 2.5 M sodium hydroxide solution over the course of 60 minutes at a rate of 2.5 ml/min.

7.23 g of iron(III) nitrate nonahydrate were dissolved in 100 ml of water. This solution was added dropwise to the suspension. After adding this solution to the suspension the pH of the suspension was again in the acid range. After 15 minutes stirring the pH was again raised with 2.5 M sodium hydroxide solution in order to precipitate the iron quantitatively, which was the case on achieving a pH of about 7.5.

The precipitated compounds were reduced with 6.8 ml of formaldehyde solution (37 wt. %), which had been diluted with 22 ml of 2.5 M sodium hydroxide solution. The suspension was filtered and the filter cake was washed with 1000 ml of water and dried under vacuum at 80° C. The Pt/Rh/Fe catalyst obtained in this way was calcined under nitrogen at 900° C. for one hour and then cooled to 600° C. and held at this temperature for a period of 1 hour.

XRD analysis demonstrated a size for the Pt/Rh/Fe alloy crystallites of 7.3 nm. The lattice constant was 0.3846 nm. The specific platinum surface area was determined with TEM (Transmission-Electro-microscopy) assuming the presence of spherical hemispheres and produced a value of 37 m$^2$/g. The catalyst had the molar composition Pt$_{50}$Rh$_{15}$Fe$_{35}$ with a platinum content of 10 wt. %.

EXAMPLE 2

43.63 g of Vulcitee (moisture content 0.97 wt. %) were suspended in 1500 ml of deionized water and stirred for 30 minutes with an Ultra-Turax.

20 g of a solution of hexachloroplatinic (IV) acid (25 wt. %) and 3.95 g of a solution of rhodium(III) chloride (20 wt. %) were diluted with deionized water to a total volume of 150 ml. Then this solution was added dropwise to the boiling support solution over the course of 15 minutes. The pH of the suspension was raised to 9 over the course of 60 minutes using 2.5 M sodium hydroxide solution. Then the precipitated compounds were reduced with 6.8 ml of formaldehyde (37 wt. %).

Only after this reduction step were 7.23 g iron(III) nitrate nonahydrate, dissolved in 100 ml of deionized water, added dropwise to the suspension. The pH was then raised over the course of 30 minutes using 2.5 M sodium hydroxide solution, stirred for 15 minutes and filtered. After drying under vacuum at 80° C. the Pt/Rh/Fe catalyst was calcined for one hour at 900° C and then for one hour at 600° C. under nitrogen.

XRD analysis demonstrated a size for the Pt/Rh/Fe alloy crystallites of 6.5 nm, the lattice constant was 0.3857 nm. The catalyst had the molar composition Pt$_{50}$Rh$_{15}$Fe$_{35}$ with a Pt content of 10 wt. %.

EXAMPLE 3

37.10 g of Vulcite® (moisture content 0.97 wt. %) were suspended in 2000 ml of fully deionized water and stirred for 15 minutes with an Ultra-Turax.

40 g of a solution of hexachloroplatinic (IV) acid (25 wt. %), 7.9 g of a solution of rhodium(III) chloride (20 wt. %) and 14.47 g of iron(III) nitrate nonahydrate were fully dissolved in 200 ml deionized water and added dropwise to the boiling suspension. Stirring was continued for 30 minutes and the pH was raised to 9 over the course of 60 minutes using 2.5 M sodium hydroxide solution. 60 ml of 2.5 M sodium hydroxide solution were added to 13.6 ml formaldehyde solution (37 wt. %) and added dropwise to the suspension. Stirring was continued for 15 minutes, the mixture was filtered and the filter cake was washed with 1500 ml of deionized water and the catalyst was then dried under vacuum at 80° C.

Then the catalyst was calcined under nitrogen at 900° C. for one hour, cooled to 600° C. and the temperature kept at this value for a further 1 hour.

XRD analysis demonstrated a size for the Pt/Rh/Fe alloy crystallites of 7.8 nm. The lattice constant was 0.3846 nm. The catalyst had the molar composition $Pt_{50}Rh_{15}Fe_{35}$ with a platinum content of 20 wt. %.

Electrochemical measurements—test conditions

Characterizing the catalysts was performed under the conditions given in Table 1 in an electrochemical full cell.

TABLE 1

Test conditions

| | |
|---|---|
| Operating temperature of the cell | 200° C. |
| Area of the electrode | 25 cm² |
| Current density | 300 mA/cm² |
| Hydrogen conversion | 80% |
| Air conversion | 60% |
| Loading of the cathode | ca. 0.5 mg Pt/cm² |

E-TEK electrodes with a loading of 0.4 Pt/cm² with an applied SiC matrix were used as anodes. $H_3PO_4$ (99 wt. % p.A. (pro Analysis)) was also used, wherein the phosphoric acid was concentrated to about 103 wt. % in the test cell. The internal resistance corrected (i.R. corrected) cell voltages at 300 mA/cm² were used for evaluating the experimental results and to compare different catalysts. From experience, the maximum cell voltage is achieved, after starting up the cell, after 100 hours of operating.

Electrochemical measurements—test results

A comparison of the electrochemical data for the test alloy catalysts showed that the Pt/Rh/Fe alloy catalysts prepared according to the invention had the best electrochemical power data in the test. The Pt/Rh/Fe alloy catalysts prepared according to EP 0 665 985 B1 did not achieve the equivalent cell voltage as the system prepared according to the invention, which can be attributed to the relatively large alloy crystallites and the low degree of metal dispersion associated therewith. The results are summarised in table 2 given below.

TABLE 2

Results of the electrochemical tests

| Catalyst | Platinum loading [mg Pt/cm²] | Cell voltage at 300 mA/cm² [mV] |
|---|---|---|
| Comparison example 1 | 0.49 | 616 |
| Comparison example 2 | 0.50 | 585 |
| Example 1 | 0.48 | 651 |
| Example 2 | 0.47 | 639 |
| Example 3 | 0.48 | 657 |

A great advantage of the process for preparing catalysts according to the invention is the fact that it uses hexachloroplatinic acid. The use of low chlorine and much more expensive precursor compounds, such as for example platinum nitrate, is not required. The noble metal cost of hexachloroplatinic acid is a great deal less than expensively prepared, chlorine reduced, noble metal compounds such as for example platinum nitrate or hydroxidic platinum(IV) compounds.

COMPARISON EXAMPLE 3

A further catalyst was prepared according to example 2. 43.63 g of Vulcite® (moisture content 0.97 wt. %) were suspended in 1500 ml of deionized water and stirred for 30 minutes with an Ultra-Turax.

20 g of a solution of hexachloroplatinic (IV) acid (25 wt. %) and 3.95 g of a solution of rhodium(III) chloride (20 wt. %) were diluted with deionized water to a total volume of 150 ml. Then this solution was added dropwise to the boiling support solution over the course of 15 minutes.

The pH of the suspension was then raised to 8.5 using a basic solution. Differently from example 2, a 0.12 M sodium hydrogen carbonate solution was used and added over the course of 120 minutes to avoid excessive foaming. A pH value of 9 could not be obtained under these conditions. Then the precipitated compounds were reduced with 6.8 ml of formaldehyde (37 wt. %).

Only after this reduction step were 7.23 g iron(III) nitrate nonahydrate, dissolved in 100 ml of deionized water, added dropwise to the suspension. The pH was then raised over the course of 30 minutes using a basic solution, stirred for 15 minutes and filtered. Differently from example 2, a 0.12 M sodium hydrogen carbonate solution was used. After drying under vacuum at 80° C. the Pt/Rh/Fe catalyst was calcined for one hour at 900° C. and then for one hour at 600° C. under nitrogen.

XRD analysis demonstrated a size for the Pt/Rh/Fe alloy crystallites of 12.2 nm, the lattice constant was 0.3867 nm. The catalyst had the molar composition $Pt_{50}Rh_{15}Fe_{35}$ with a Pt content of 10 wt. %.

This comparison example confirms that the use of a strong base as precipitation agent is essential for producing the catalyst according to the invention. Using sodium hydrogen carbonate only yields coarse alloy crystallites with crystallite sizes of more than 10 nm while using sodium hydroxide solution produces crystallite sizes of less than 10 nm.

Further variations and modifications of the foregoing will be apparent to those skilled in the art and are intended to be encompassed by the claims appended hereto.

German priority application 198 48 032.6 filed October 17, 1998 is relied on and incorporated herein by reference.

We claim:

1. A platinum alloy catalyst comprising an alloy of 40 to 60 atom-% of platinum, 10 to 20 atom-% of rhodium and 20 to 50 atom-% of iron in the form of finely divided alloy particles, deposited on an electrically conductive carbon support wherein the average particle size of the alloy particles is less than 10 nm.

2. The platinum alloy catalyst according to claim 1, wherein the platinum is present in an amount of 5 to 50 wt %, with respect to the total weight of catalyst.

3. The platinum alloy catalyst according to claim 2 wherein the platinum is present in an amount of 10 to 20% by weight, based on the total weight of catalyst.

4. A process for preparing a platinum alloy catalyst according to claim 1, comprising:
 a) preparing a support suspension by suspending carbon support in water,
 b) heating the support suspension to the boiling point and hold the temperature at the boiling point during the following steps,
 c) adding aqueous solutions of hexachloroplatinic acid and rhodium chloride and iron nitrate,
 d) precipitating platinum, rhodium and iron by the slow addition of sodium hydroxide solution, to form precipitated compounds
 e) reducing the precipitated compounds by adding an aqueous reducing agent, to obtain the catalyst
 f) separating the catalyst from the aqueous phase of the support suspension,
 g) drying the catalysts,
 h) calcining the catalyst in an inert atmosphere at 700 to 1000° C. for a period of 0.5 to 2 hours, i) lowering the temperature to 700 to 500° C. and calcining the catalyst for a further 0.5 to 2 hours.

5. The process according to claim 4, further comprising adding the aqueous solutions of hexachloroplatinic acid and rhodium chloride and also of iron nitrate takes place in two steps, wherein a common solution of hexachloroplatinic acid and rhodium chloride is first added to the support suspension and platinum and rhodium are precipitated with sodium hydroxide solution, before adding iron nitrate to the support suspension and precipitating by the further addition of sodium hydroxide solution.

6. The process according to claim 5, wherein reduction step (e) is performed directly after precipitating platinum and rhodium.

7. The process according to claim 4, wherein in step (c) hexachloroplatinic acid, rhodium chloride and iron nitrate are added to the support suspension from a common, aqueous solution.

8. A platinum alloy catalyst comprising an alloy of 40 to 60 atom-% of platinum, 10 to 20 atom-% of rhodium and 20 to 50 atom-% of iron in the form of finely divided alloy particles, deposited on an electrically conductive carbon support wherein the average particle size of the alloy particles is less than 10 nm, produced by the process of claim 4.

9. A fuel cell containing the catalyst of claim 1.

* * * * *